US010982415B2

(12) United States Patent
Leslie et al.

(10) Patent No.: US 10,982,415 B2
(45) Date of Patent: Apr. 20, 2021

(54) SYSTEM AND METHOD OF CALCULATING A PAYLOAD WEIGHT

(71) Applicant: CQMS Pty Ltd, Queensland (AU)

(72) Inventors: Bruce Alexander Leslie, Goodna (AU); David Clinton Andrews, Goodna (AU); Nicholas Simon Hillier, Goodna (AU)

(73) Assignee: CQMS PTY LTD, Queensland (AU)

( * ) Notice: Subject to any disclaimer, the term of this patent is extended or adjusted under 35 U.S.C. 154(b) by 0 days.

(21) Appl. No.: 15/539,120

(22) PCT Filed: Dec. 24, 2014

(86) PCT No.: PCT/AU2014/050449
§ 371 (c)(1),
(2) Date: Jun. 22, 2017

(87) PCT Pub. No.: WO2016/101002
PCT Pub. Date: Jun. 30, 2016

(65) Prior Publication Data
US 2017/0370075 A1 Dec. 28, 2017

(51) Int. Cl.
| *E02F 9/26* | (2006.01) |
| *G01G 19/08* | (2006.01) |
| *G01G 23/01* | (2006.01) |
| *G01G 5/06* | (2006.01) |
| *G01G 19/12* | (2006.01) |
| *G01G 23/48* | (2006.01) |

(52) U.S. Cl.
CPC .............. *E02F 9/264* (2013.01); *G01G 5/06* (2013.01); *G01G 19/083* (2013.01); *G01G 19/12* (2013.01); *G01G 23/01* (2013.01); *G01G 23/48* (2013.01)

(58) Field of Classification Search
CPC ........ G01G 5/06; G01G 19/083; G01G 19/12; G01G 23/01; G01G 23/48; E02F 9/264
See application file for complete search history.

(56) References Cited

U.S. PATENT DOCUMENTS

| 3,976,150 | A | * | 8/1976 | Wilson ................. G01G 11/006 |
| | | | | 177/16 |
| 4,919,222 | A | * | 4/1990 | Kyrtsos ..................... G01G 5/04 |
| | | | | 177/139 |
| 5,082,071 | A | * | 1/1992 | Kyrtsos ................ G01G 19/083 |
| | | | | 177/25.14 |

(Continued)

FOREIGN PATENT DOCUMENTS

| CN | 1635343 A | 7/2005 |
| CN | 101832810 A | 9/2010 |

(Continued)

*Primary Examiner* — Randy W Gibson
(74) *Attorney, Agent, or Firm* — Schwabe Williamson & Wyatt, PC

(57) ABSTRACT

A system of calculating a payload weight, the system including: a first sensor configured to assist in determining an actuator load associated with a ram, the ram being connected to a lifting member; and a calibration module configured to retrieve a calibration factor based on movement of the ram, the calibration factor being applied to the actuator load to thereby provide an adjusted actuator load; wherein the payload weight is calculated based on the adjusted actuator load.

15 Claims, 3 Drawing Sheets

(56) References Cited

U.S. PATENT DOCUMENTS

| | | | | |
|---|---|---|---|---|
| 5,105,896 A | * | 4/1992 | Kyrtsos | E02F 9/264 |
| | | | | 177/139 |
| 5,285,020 A | * | 2/1994 | Jurca | G01G 19/10 |
| | | | | 177/139 |
| 5,509,293 A | | 4/1996 | Karumanchi | |
| 5,666,295 A | * | 9/1997 | Bruns | B66F 17/003 |
| | | | | 177/139 |
| 6,552,279 B1 | * | 4/2003 | Lueschow | G01G 19/10 |
| | | | | 177/141 |
| 6,627,825 B1 | * | 9/2003 | Creswick | G01G 5/04 |
| | | | | 177/141 |
| 6,868,364 B2 | * | 3/2005 | Allerding | G01G 19/10 |
| | | | | 702/174 |
| 8,156,048 B2 | * | 4/2012 | Mintah | G01G 19/10 |
| | | | | 177/136 |
| 8,271,229 B2 | | 9/2012 | Hsu | |
| 8,515,627 B2 | | 8/2013 | Marathe | |
| 8,924,094 B2 | * | 12/2014 | Faivre | E02F 9/2029 |
| | | | | 172/465 |
| 9,091,586 B2 | * | 7/2015 | Hague | G01G 19/10 |
| 9,200,432 B1 | * | 12/2015 | Shatters | G01G 19/083 |
| 9,464,403 B2 | * | 10/2016 | Shatters | E02F 3/422 |
| 2009/0127031 A1 | * | 5/2009 | Corder | G01G 19/10 |
| | | | | 187/393 |
| 2009/0139119 A1 | | 6/2009 | Janardhan | |

FOREIGN PATENT DOCUMENTS

| | | |
|---|---|---|
| DE | 10146421 A1 | 5/2002 |
| EP | 2508854 B1 | 10/2015 |

* cited by examiner

SYSTEM AND METHOD OF CALCULATING A PAYLOAD WEIGHT

CROSS-REFERENCE TO RELATED APPLICATION

The present application is a national phase entry under 35 U.S.C. § 371 of International Application No. PCT/AU2014/050449, filed Dec. 24, 2014, entitled "A SYSTEM AND METHOD OF CALCULATING A PAYLOAD WEIGHT," which designates the United States of America, the entire disclosure of which is hereby incorporated by reference in its entirety and for all purposes.

FIELD OF THE INVENTION

The invention relates to a system and method of calculating a payload weight. In particular, the invention relates, but is not limited, to a system and method of improving accuracy in payload calculations.

BACKGROUND TO THE INVENTION

Reference to background art herein is not to be construed as an admission that such art constitutes common general knowledge in Australia or elsewhere.

Hydraulic operated equipment is commonly used for conveniently moving payloads. However, when payload weight is overestimated in, for example, an excavator bucket, the excavator bucket may be underloaded. This decreases productivity as a user may have to make further trips to complete a task. On the other hand, when payload weight is underestimated, this may increase the risk of failure for the excavator due to overloading. Similarly, underestimating payload weight may cause overloading of downstream equipment (i.e. trucks, conveyors etc.) when the payload is delivered thereto. This may cause failure or shutdown of the downstream equipment, which again decreases productivity.

Payload weight in an excavator may be calculated by calculating the force associated with a hydraulic ram. The force associated with the hydraulic ram may be calculated by taking pressure readings at a point in a hydraulic circuit that supplies the hydraulic ram. However, errors are introduced into this method by, for instance, hydraulic losses created in the hydraulic circuit components between the pressure measurement and the ram. Furthermore, the hydraulic losses vary with the viscosity of the hydraulic fluid and the viscosity for a particular hydraulic fluid varies with its temperature.

In addition, due to the frictional effects within the cylinder of the hydraulic ram, the pressure measured therein does not exactly correlate to the force associated with the hydraulic ram. These errors translate to errors in payload calculations.

OBJECT OF THE INVENTION

It is an aim of this invention to provide a system and method of calculating a payload weight which overcomes or ameliorates one or more of the disadvantages or problems described above, or which at least provides a useful alternative.

Other preferred objects of the present invention will become apparent from the following description.

SUMMARY OF INVENTION

In one form, although not necessarily the only or broadest form, the invention resides in a system of calculating a payload weight, the system including:

a first sensor configured to assist in determining an actuator load associated with a ram, the ram being connected to a lifting member; and a calibration module configured to retrieve a calibration factor based on movement of the ram, the calibration factor being applied to the actuator load to thereby provide an adjusted actuator load;

wherein the payload weight is calculated based on the adjusted actuator load.

Preferably, the first sensor is located in a first inlet/outlet hose connected to the ram. Preferably, the system includes a first related sensor located in a first related inlet/outlet hose connected to the ram. Preferably, the actuator load is in the form of a pressure difference between a first load measured by the first sensor and a first related load measured by the first related sensor. Preferably, the ram is a hydraulic ram.

Preferably, the calibration factor accounts for a pressure drop. Preferably, the pressure drop is from the first sensor up to and including the ram. Preferably, the pressure drop is from the first sensor to the first related sensor.

Preferably, the lifting member is in the form an excavator arm and bucket. Preferably, the excavator arm includes a stick and a boom. Preferably, the stick is pivotally connected to the bucket. Preferably, the boom is pivotally connected to the stick.

Preferably, retrieving the calibration factor based on movement of the ram includes determining an associated system state. Preferably, the associated system state includes an actuation position of the ram, at least one geometric arrangement position of the lifting member, a movement differential of the ram, a volume flow rate of fluid supplying the ram and/or a direction of travel of the ram.

Preferably, the movement differential of the ram includes a velocity and/or an acceleration relating to the ram. Preferably, the velocity relating to the ram is in the form of a flow rate of fluid being supplied to the ram. In this regard, upon determining the flow rate of fluid being supplied to the ram, for example, the calibration factor is retrieved by determining a pressure drop. Preferably, the pressure drop is determined from an associated pressure drop relationship. Preferably, the associated pressure drop relationship includes a generic function, a fitted curve and/or a lookup table.

Preferably, retrieving the calibration factor based on movement of the ram includes retrieving a comparison error value. Preferably, the comparison error value adjusts the actuator load such that the payload weight, when based on the actuator load taken with a known payload weight, substantially matches the known payload weight.

Preferably, the known payload weight is zero. Preferably, the known payload weight is above zero.

Preferably, retrieving the comparison error value is based on the associated system state. For example, the comparison error value may be retrieved on the basis of the flow rate of fluid being supplied to the ram.

Preferably, in retrieving the comparison error value, the calibration module is configured to first calculate the comparison error value. Preferably, the calibration module calculates the comparison error value by:

calculating the payload weight based on the actuator load taken with a known payload weight;

comparing the payload weight to the known payload weight; and determining an error value to adjust the actuator load such that the payload weight substantially matches the known payload weight.

Preferably, in determining the error value a pressure drop is determined from the associated pressure drop relationship.

Preferably, the calibration module records the comparison error value that is calculated to an associated system state. The associated system state represents determined conditions that relate to a state at which the comparison error value was calculated. For example, the calibration module records the comparison error value to the associated system state including an actuation position of the ram, at least one geometric arrangement position of the lifting member, a movement differential of the ram, the volume flow rate of fluid supplying the ram and/or the direction of travel of the ram. This allows the comparison error value to be retrieved for later use based on the associated system state.

Preferably, the calibration module calculates and records comparison error values for a range of respective associated system states. For example, the calibration module calculates and records comparison error values for a range of actuation positions of the ram, a range of geometric arrangement positions of the lifting member, a range of movement differentials of the ram, a range of volume flow rates of fluid supplying the ram and/or the directions of travel of the ram. This allows comparison error values to be retrieved for later use based on the associated system states.

Preferably, the system includes a temperature sensor. Preferably, the temperature sensor measures a fluid temperature related to the ram.

Preferably, retrieving the calibration factor based on movement of the ram includes retrieving a temperature error value. Preferably, the calibration module is configured to retrieve the temperature error value from a number of stored temperature error values based on the measured fluid temperature related to the ram.

Preferably, the temperature error value accounts for pressure changes due to a change in fluid temperature related to the ram as opposed to a change in weight of the payload.

For example, the temperature error value accounts for changes in viscosity in fluid related to the ram. Preferably, the changes in viscosity are taken into account in the associated pressure drop relationship. Preferably, the calibration module is configured to calculate the calibration factor by combining the comparison error value with the temperature error value.

In another form the invention resides in a method of calculating a payload weight, the method including the steps of:

determining an actuator load associated with a ram connected to lifting equipment;

retrieving a calibration factor based on movement of the ram;

applying the calibration factor to the actuator load to form an adjusted actuator load; and calculating the payload weight based on the adjusted actuator load.

Preferably, the step of determining the actuator load includes measuring a first load with a first sensor. Preferably, the step of determining the actuator load includes measuring a first related load with a first related sensor. Preferably, the step of determining the actuator load includes calculating a pressure difference between the first load measured by the first sensor and the first related load measured by the first related sensor.

Preferably, the step of retrieving the calibration factor based on movement of the ram includes determining an actuation position of the ram, at least one geometric arrangement position of the lifting member, a movement differential of the ram, a volume flow rate of fluid supplying the ram and/or a direction of travel of the ram.

Preferably, the movement differential of the ram includes a velocity and/or an acceleration relating to the ram. Preferably, the velocity relating to the ram is in the form of a flow rate of fluid being supplied to the ram. In this regard, upon determining the flow rate of fluid being supplied to the ram, for example, the calibration factor is retrieved by determining a pressure drop in accordance with an associated pressure drop relationship.

Preferably, the step of retrieving the calibration factor based on movement of the ram includes retrieving a comparison error value. Preferably, the comparison error value adjusts the actuator load such that the payload weight, when based on the actuator load taken with a known payload weight, substantially matches the known payload weight. Preferably, the known payload weight is zero. Preferably, the known payload weight is above zero.

Preferably, the step of retrieving the comparison error value is determined on the basis of the associated system state.

Preferably, the step of retrieving the comparison error value includes first calculating the comparison error value. Preferably, the step of calculating the comparison error value includes:

calculating the payload weight based on the actuator load taken with a known payload weight;

comparing the payload weight to the known payload weight; and determining an error value to adjust the actuator load such that the payload weight substantially matches the known payload weight.

Preferably, the step of determining the error value includes determining a pressure drop with an associated pressure drop relationship.

Preferably, the method further includes recording the comparison error value that is calculated to an associated system state. The associated system state represents determined conditions that relate to a state at which the comparison error value was calculated. For example, the associated system state includes the actuation position of the ram, the at least one geometric arrangement position of the lifting member, the movement differential of the ram, the volume flow rate of fluid supplying the ram and/or the direction of travel of the ram.

Preferably, the method further includes calculating and recording comparison error values for a range of respective associated system states. For example, comparison error values are calculated and recorded for a range of actuation positions of the ram, a range of geometric arrangement positions of the lifting member, a range of movement differentials the ram, a range of volume flow rates of fluid supplying the ram and/or the direction of travel of the ram.

Preferably, the step of retrieving the calibration factor based on movement of the ram includes retrieving a temperature error value from a number of temperature error values based on a measured fluid temperature related to the ram.

Preferably, the step of retrieving the temperature error value includes calculating the temperature error value based changes in viscosity and the associated pressure drop relationship.

Preferably, the step of calculating the calibration factor includes combining the comparison error value with the temperature error value.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
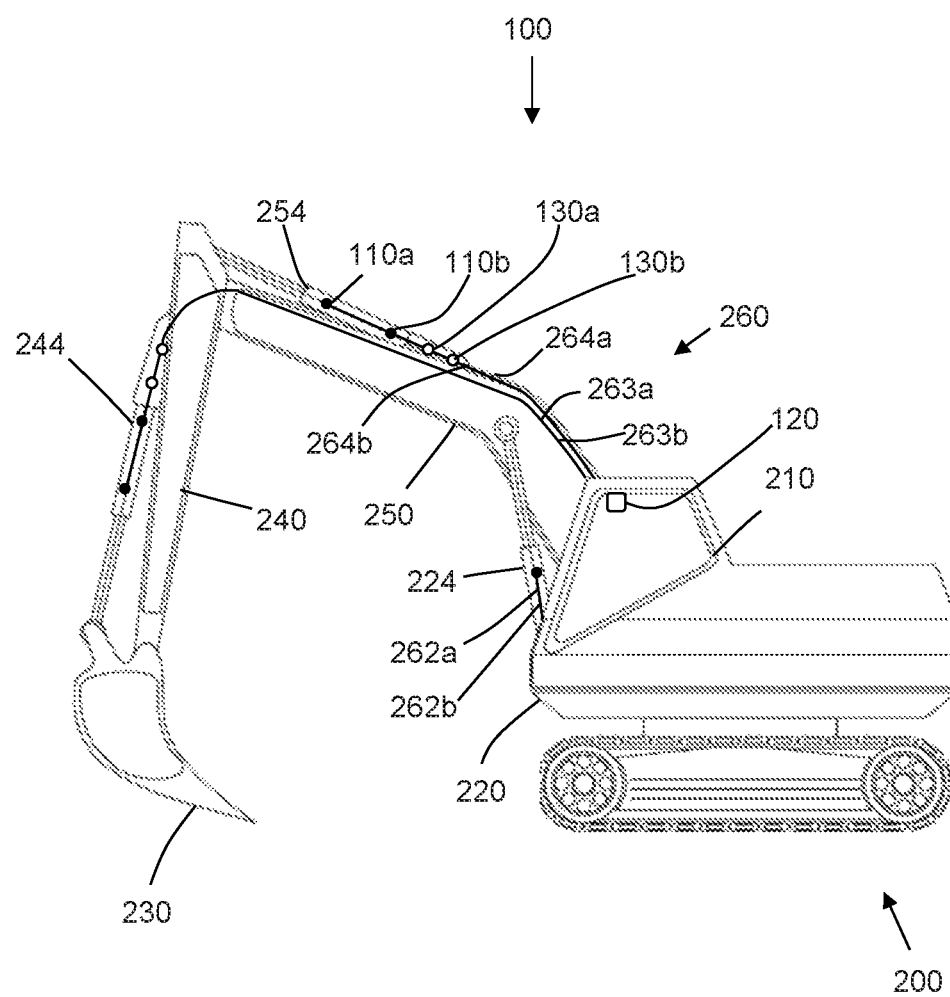
FIG. 1 illustrates a system of calculating a payload weight, according to an embodiment of the invention, fitted to an excavator.

FIG. 1 illustrates a system 100 of calculating a payload weight, according to an embodiment of the invention, fitted to lifting equipment in the form of an excavator 200. It would be appreciated that the system 100 may be fitted to other lifting equipment including a backhoe or crane.

The excavator 200 includes a cab 210, a cab platform 220, and a lifting member having an excavator arm and bucket 230. The excavator arm includes a stick 240 and a boom 250. The bucket 230 is pivotally connected to the stick 240. The stick 240 is pivotally connected to the boom 250. The boom 250 is also pivotally connected to the cab platform 220.

The excavator 200 includes a ram 244 associated with the stick 240. The excavator 200 also includes a ram 254 associated with the boom 250. In addition, a further ram 224 is located between the cab platform 220 and boom 250. It would be appreciated that the further ram 224 is also associated with the boom 250 and, similarly, that ram 254 is associated with the stick 240.

The rams 224, 244, 254 are hydraulic rams. The hydraulic rams 224, 244, 254 are connected to a hydraulic circuit 260. To this end, hydraulic ram 224 is connected to hydraulic hoses 262a, 262b, hydraulic ram 244 is connected to hydraulic hose 263a, 263b and hydraulic ram 254 is connected to hydraulic hose 264a, 264b. As would be appreciated by a person skilled in the art, two hydraulic hoses allow extension and retraction of the rams 224, 244, 254 depending on the direction of fluid flow.

The system 100 includes a first sensor and a first related sensor in the form of pressure sensors 110a, 110b. The system 100 also a calibration module 120 and temperature sensors 130a, 130b.

In this embodiment, pressure sensor 110a is connected to hydraulic hose 264a to measure a first load (i.e. pressure) relating to the ram 254. Similarly, pressure sensor 110b is connected to hydraulic hose 264b to measure a first related load (i.e. pressure) of the ram 254.

Temperature sensor 130a is connected to hydraulic hose 264a to measure the temperature of the fluid being supplied to and from the ram 254. Similarly, temperature sensor 130b is connected to hydraulic hose 264b to measure the temperature of the fluid being supplied to and from the ram 254.

As would be appreciated by a person skilled in the art, pressure and/or temperature sensors may also be connected to hydraulic hoses 262a, 262b, 264a, 264b in order to carry out the present invention, as outlined further below.

The system 100 also includes further sensors (not shown) in order to measure geometric arrangement positions of the lifting member, an actuation position of the ram 254 (i.e. the extension a member extends from a body of the ram 254) and a movement differential of the ram 254. The movement differential of the ram in this embodiment includes a velocity in the form of fluid flow rate being supplied to and from the ram 254. It would be appreciated that, for example, a velocity of a member extending/retracting from a body of the ram 254 may also be used to carry out the present invention. Similarly, a volume flow rate of fluid being supplied to and from the ram 254, for instance, may also be used to carry out the present invention. In addition, as would be appreciated by a person skilled in the art, determining the direction of travel of the ram 254 (i.e. the direction of a member extending/retracting from the ram) may also provide assistance in carrying out the present invention.

The calibration module 120 is installed in the cab 210 of the excavator 200. The sensors 110, 130 and further sensors (not shown) are in communication with the calibration module 120. It would be appreciated that the sensors 110, 130 and further sensors may be in wired or wireless communication with the calibration module 120.

The calibration module 120 is configured to determine an actuator load. The actuator load in this embodiment is in the form of a pressure difference between the first load measured by pressure sensor 110a and the first related load measured by pressure sensor 110b. It would be appreciated by a person skilled in the art that sensor 110a may be used alone to determine the actuator load if the pressure in hydraulic hose 264b remains substantially constant.

The calibration module 120 is also configured to retrieve a calibration factor based on movement of the ram 254. The calibration factor accounts for a pressure drop from the pressure sensor 110a to the pressure sensor 110b.

In retrieving the calibration factor, the calibration module 120 is configured to determine an associated system state from the further sensors. That is, the calibration module 120 determines an associated system state including the geometric arrangement position of the lifting member and the fluid flow rates being supplied to and from the ram 254. From the associated system state, the calibration module 120 may determine the pressure drop (i.e. calibration factor) from an associated pressure drop relationship (e.g., Darcy-Weisbach equation or Hagen-Poiseuille equation). However, the present embodiment takes the following form.

Based on the associated system state, the calibration module is configured to retrieve a comparison error value. The comparison error value adjusts the actuator load of the ram 254 such that the calculated payload weight, when based on the actuator load taken with a known payload weight in the bucket 230, substantially matches the known payload weight in the bucket 230. That is, the actuator load is adjusted by the comparison error value in order to take into account pressure drops and match a known payload weight in the bucket 230. As outlined further below, the known payload weight in this embodiment is zero.

In order to retrieve the comparison error value, the calibration module 120 is also configured to initially calculate the comparison error value in this embodiment. Calculating the comparison error value is outlined further in the method below.

The calibration module 120 is also configured to retrieve a temperature error value in order to calculate the calibration factor. The calibration module 120 in this embodiment is configured to retrieve the temperature error value from a number of stored temperature error values, based on the measured fluid temperatures from the temperature sensors 130a, 130b. However, as would be appreciated by a person skilled in the art, a temperature error value may be calculated from the measured fluid temperatures from the temperature sensors 130a, 130b. That is, as the temperature error value accounts for changes in viscosity in fluid related to the ram, the changes in viscosity may taken into account in associated pressure drop relationships.

The calibration module 120 is configured to calculate the calibration factor by combing the comparison error value with the temperature error value, as further outlined below. The payload weight is calculated based on the adjusted actuator load.

Figure 2:
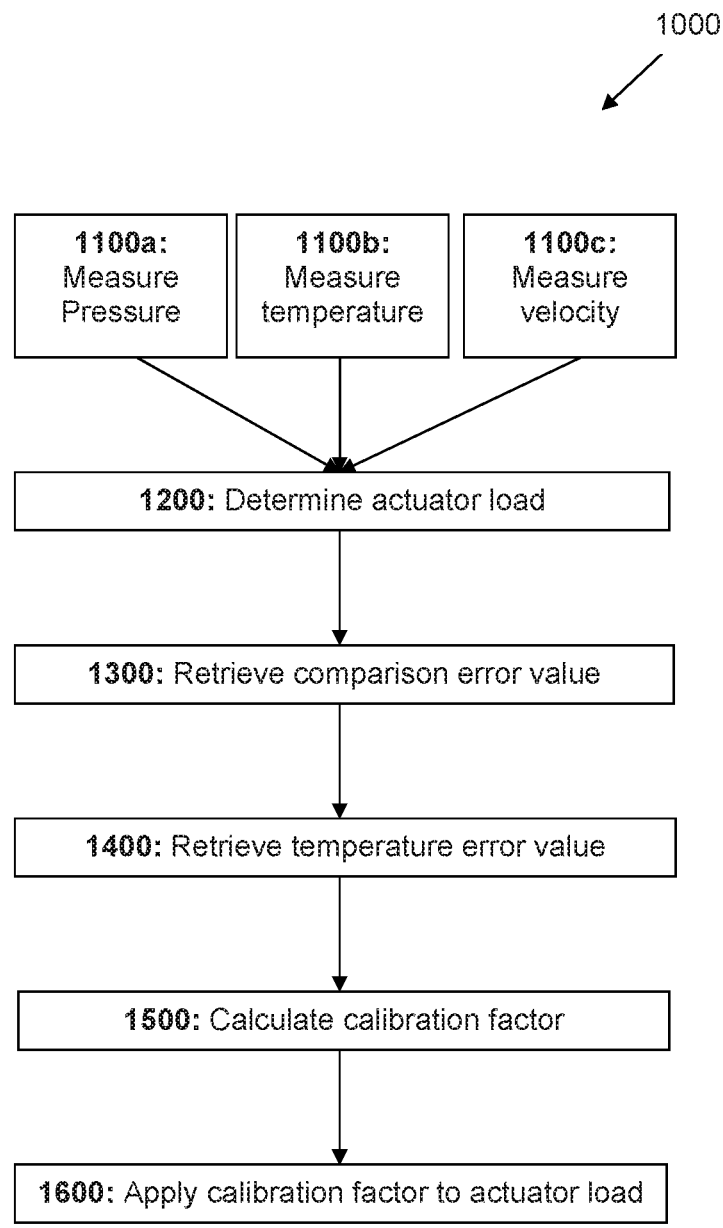
FIG. 2 illustrates a flow chart of a method of calculating a payload weight with reference to FIG. 1.

FIG. 2 illustrates a method 1000 of calculating a payload weight with reference to the items in FIG. 1 including system 100.

At step 1100*a*, the pressure sensors 110 measures the pressure in the hydraulic hoses 264*a*, 264*b* that are connected to the ram 254. At step 1100*b*, which may occur before, with or after step 1100*a*, the temperature sensors 130 also measures the temperature of the fluid in the hydraulic hoses 264*a*, 264*b*. The pressures and temperatures measured by the sensors 110, 130 are communicated to the calibration module 120. Similarly, at step 1100*c*, which may occur before, with or after step 1100*a*, 1100*b*, the other sensors measure a velocity in the form of fluid flow rate being supplied to and from the ram 254 and a geometric position of the lifting member.

At step 1200, the calibration module 120 determines an actuator load. The actuator load in this embodiment is in the form of a pressure difference between a first load measured by the first sensor 110*a* and a first related load measured by the first related sensor 110*b*.

Figure 3:
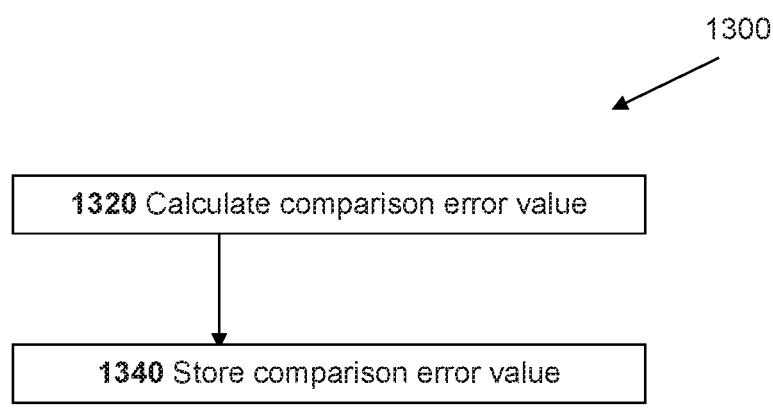
FIG. 3 illustrates a flow chart for part of the method of calculating the payload weight outlined in FIG. 2.

At step 1300, the calibration module 120 retrieves a comparison error value. The comparison error value adjusts for errors between a known payload weight in the bucket 230 and a calculated payload weight based on an actuator load taken with a known payload weight in the bucket 230. Step 1300 is outlined further in FIG. 3.

To retrieve the comparison error value at step 1300, the calibration module 120 initially calculates the comparison error value, in this embodiment at step 1320. To calculate the comparison error value, a known payload weight is determined in the bucket 230. In this embodiment, the known payload weight is zero (i.e. nothing is loaded in the bucket 230). The excavator 200 supports the known payload weight above the ground. Following this, the actuation pressure, taken with the known payload weight in the bucket 230, is used to calculate a payload weight.

The (calculated) payload weight is then compared to the known payload weight in the bucket 230 (i.e. zero). An error value is then determined to adjust the actuator load such that the (calculated) payload weight substantially matches the known payload weight.

At step 1340, the error value determined to adjust the actuation is stored as a comparison error value. The comparison error value is stored on the basis of an associated system state. That is, the comparison error value is stored on the basis of the geometric position of the lifting member and the velocity in the form of fluid flow rate being supplied to/from the ram 254. Accordingly, when this associated system state occurs in future, the stored comparison error value assists in ensuring that the calculated payload weight corresponds to the actual payload weight in the bucket 230.

In view of the above, it would also be appreciated that the ram 254 and the lifting member may be moved through a range of positions in order to calculate and record a range of comparison error values for associated system states.

At step 1400, the calibration module 120 retrieves a temperature error value. The temperature error value is retrieved from a number of temperature error values and is based on the measured temperature received from the temperature sensors 130*a*, 130*b*. That is, for instance, if the measured temperature is 50 degrees, a temperature error value relating to 50 degrees, from the temperature error values, will be retrieved. It would also be appreciated that the temperature error value may be retrieved by calculating the temperature error value based on the measured temperatures and the associated pressure drop relationship (e.g., Darcy-Weisbach equation or Hagen-Poiseuille equation).

The temperature error values account for pressure changes due to a change in fluid temperature related to the ram 254 as opposed to a change in weight of the payload. For example, if the temperature of the hydraulic fluid rises by five degrees, whilst holding the payload, the temperature error values will compensate the measured pressures of the sensor 110 to assist in ensuring the calculated payload weight corresponds to the actual payload weight. In this regard, it would be appreciated that the temperature error value accounts for changes in viscosity in fluid related to the ram 254.

At step 1500, the calibration module 120 calculates a calibration factor based on the comparison error value and temperature error value. The calibration factor adjusts for pressure drops in the system between, for instance, the measured pressures from the first sensor 110*a* to the second sensor 110*b*. For example, the calibration factor may adjust for a 5 percent error found due to the comparison error value and a 2 percent error found due to the temperature error value. In calculating the calibration factor, the calibration module combines the comparison error value with the temperature error value in this embodiment. However, it would be appreciated that either compensation may be used in isolation without the other.

At step 1600, the calibration factor is applied to the actuator load to form an adjusted actuator load. The adjusted actuator load is then used to calculate payload weight. In this regard, it would be appreciated that by applying the calibration factor to the actuator load, accuracy in payload calculations is improved.

Accordingly, by improving accuracy in payload calculations, the system 100 and method 1000 allow accurate calculation of payload weight in the bucket 230. This increases productivity by, for example, avoiding a user having to make further payload trips due to underloading the bucket 230. Furthermore, damage is avoided if, for instance, the payload is overloading the bucket 230 due to the calculated payload weight being underestimated from the pressure sensor 110.

In addition, it would be appreciated that the calibration module 120 may be calibrated elsewhere (e.g. on a separate excavator) and then installed onto the excavator 200. This avoids having to calibrate the calibration module 120 on each lifting machine.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The claims defining the invention are as follows:

1. A system of calculating a payload weight being lifted by a lifting vehicle, the system including:
    a first sensor configured to assist in determining an actuator load associated with a ram, the ram being connected to a lifting member of the lifting vehicle; and
    a calibration module configured to retrieve a calibration factor based on movement of the ram, the calibration factor being applied to the actuator load to thereby provide an adjusted actuator load;
    wherein the payload weight is calculated based on the adjusted actuator load,
    wherein retrieving the calibration factor based on movement of the ram includes calculating and retrieving a comparison error value based on an associated system state,
    wherein the calibration module calculates the comparison error value by:
        calculating the an initial payload weight based on the actuator load taken with a known payload weight;
        comparing the initial payload weight to the known payload weight; and
        determining an error value to adjust the actuator load such that the initial payload weight substantially matches the known payload weight,
    wherein the associated system state includes a geometric arrangement position of the lifting member and a flow rate of fluid being supplied to the ram.

2. The system of claim 1, wherein the comparison error value adjusts the actuator load such that the payload weight, when based on the actuator load taken with a known payload weight, substantially matches the known payload weight.

3. The system of claim 2, wherein the known payload weight is zero.

4. The system of claim 1, wherein the calibration module is configured to calculate a range of comparison error values by moving the ram through a range of actuation positions.

5. The system of claim 1, wherein retrieving the calibration factor based on movement of the ram includes retrieving a temperature error value that is associated with a measured fluid temperature related to the ram.

6. The system of claim 1, wherein the system includes a first related sensor configured to measure a first related load associated with the ram.

7. The system of claim 6, wherein the actuator load is in the form of a pressure difference between the first load measured by the first sensor and a first related load measured by the first related sensor.

8. The system of claim 7, wherein the first sensor is located in a first inlet/outlet hose connected to the ram and the first related sensor is located in a first related inlet/outlet hose connected to the ram.

9. The system of claim 1, wherein the ram is a hydraulic ram.

10. The system of claim 1, wherein the lifting member includes an excavator arm and a bucket.

11. A method of calculating a payload weight being lifted by a lifting vehicle, the method including the steps of:
    determining an actuator load associated with a ram connected to a lifting member of the lifting vehicle;
    retrieving a calibration factor based on movement of the ram;
    applying the calibration factor to the actuator load to form an adjusted actuator load; and
    calculating the payload weight based on the adjusted actuator load,
    wherein the step of retrieving the calibration factor based on movement of the ram includes calculating and retrieving a comparison error value based on an associated system state,
    wherein the comparison error value is calculated by:
        calculating the an initial payload weight based on the actuator load taken with a known payload weight;
        comparing the initial payload weight to the known payload weight; and
        determining an error value to adjust the actuator load such that the initial payload weight substantially matches the known payload weight,
    wherein the associated system state includes a geometric arrangement position of the lifting member and a flow rate of fluid being supplied to the ram.

12. The method of claim 11, wherein the step of retrieving the calibration factor based on movement of the ram includes determining a movement differential of the ram in the form of the flow rate of fluid being supplied to the ram.

13. The method of claim 11, wherein the comparison error value adjusts the actuator load such that the payload weight, when based on the actuator load taken with a known payload weight, substantially matches the known payload weight.

14. The method of claim 13, the step of calculating the calibration factor includes combining the comparison error value and the temperature error value.

15. The method of claim 11, wherein the lifting member is in the form an excavator arm and bucket.

* * * * *